Sept. 7, 1926.  
G. H. BRUDER  
DIRECTION SIGNAL  
Filed Nov. 6, 1925
1,599,005
2 Sheets-Sheet 1
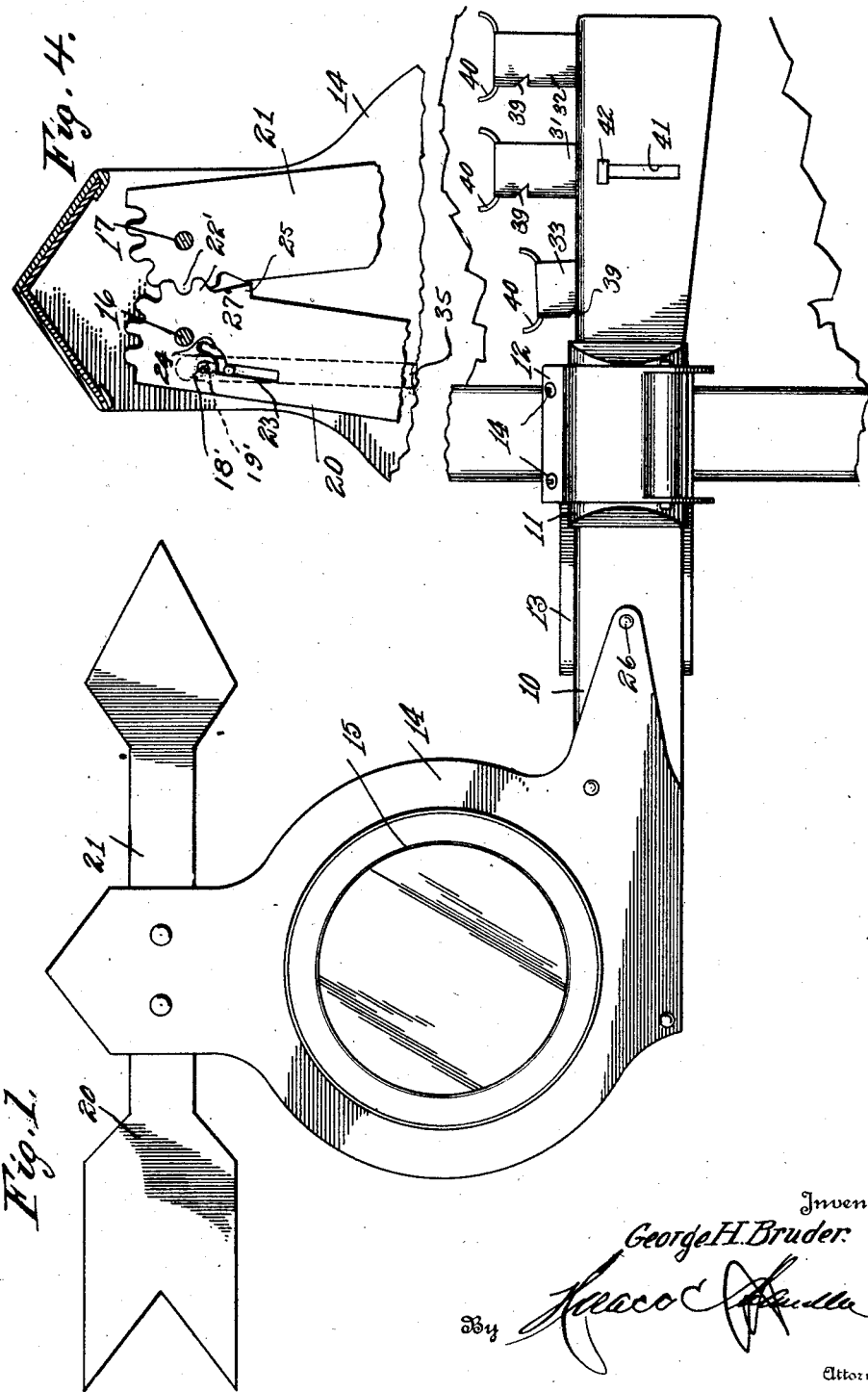
Inventor  
George H. Bruder.  
By  
Attorney Sept. 7, 1926.
G. H. BRUDER
DIRECTION SIGNAL
Filed Nov. 6, 1925
1,599,005
2 Sheets-Sheet 2
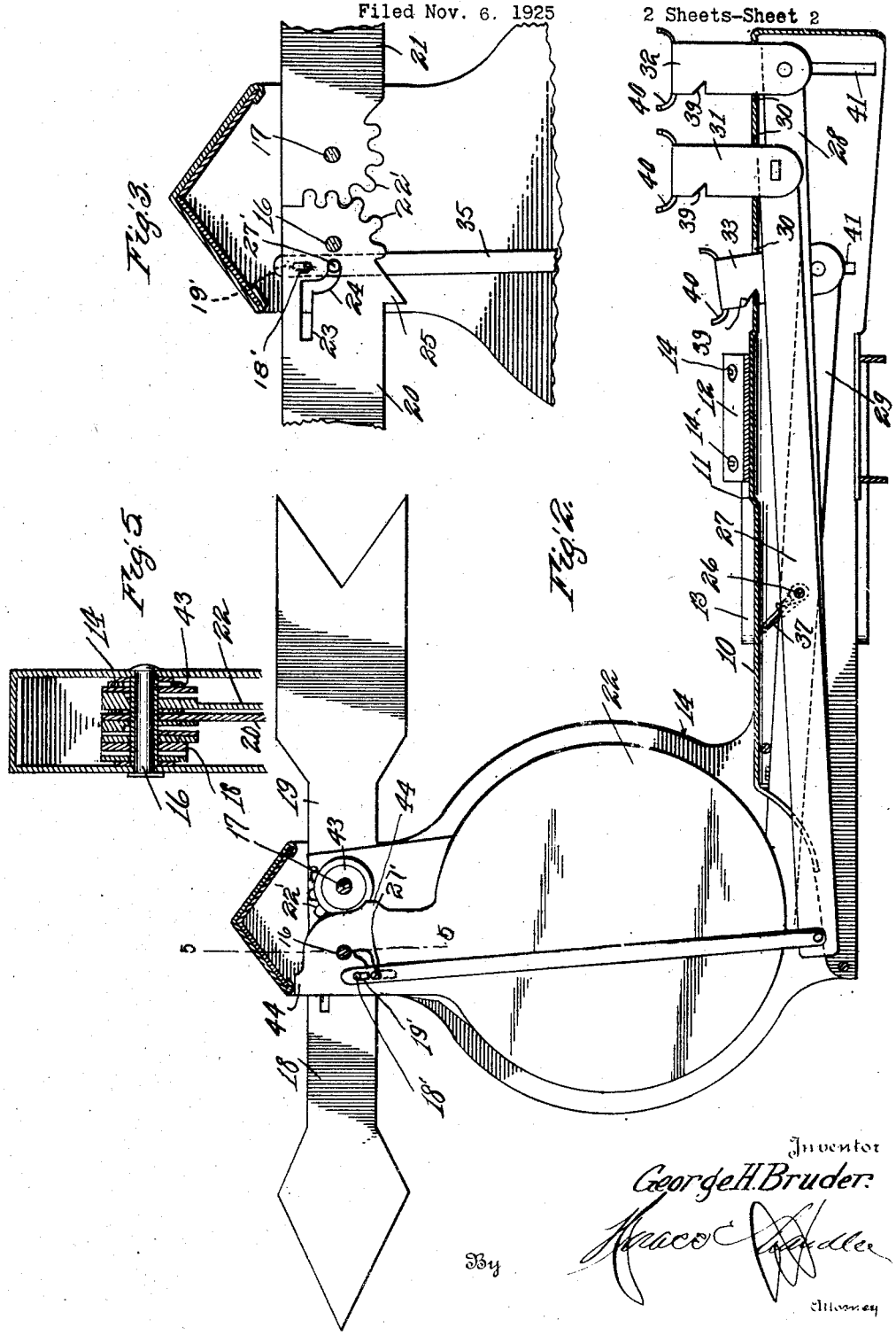
Inventor
George H. Bruder.
By
Attorney Patented Sept. 7, 1926.

1,599,005

UNITED STATES PATENT OFFICE.

GEORGE H. BRUDER, OF WEYMOUTH, MASSACHUSETTS.

DIRECTION SIGNAL.

Application filed November 6, 1925. Serial No. 67,380.

This invention relates to new and useful improvements in signaling devices, and particularly to signaling devices for automobiles, whereby to indicate to the drivers of other vehicles an intended change of direction.

One object of the invention is to provide a device of this character which is simple in construction, easy to operate, and which can be readily attached to the windshield so that the signals may be seen by others, and the operating means be within easy reach of the driver.

Another object is to provide a signaling device of this character wherein the semaphore arms are held in lowered position against accidental movement toward signaling position, and also against rattling or chattering.

Another object is to provide a device which can be readily clamped to the windshield of an automobile, and which is capable of adjustment into vertical position, in the event that the windshield is not vertical.

Another object is to provide controlling keys for the semaphore arms which can be easily locked in operative position, whereby to maintain the semaphore arm in signaling position, at the will of the operator.

A further object is to provide a device of this character wherein the signaling mechanism, and the operating means therefor, are assembled as a unit, so that the device is simply secured to the windshield of the automobile, without the necessity of boring holes in the automobile, or otherwise altering or modifying the same.

Other objects and advantages will be apparent from the following description when taken in connection with the accompanying drawings.

In the drawings:

Figure 1 is an elevation of a signaling device made in accordance with the present invention, showing the right directing signal in elevated position.

Figure 2 is a vertical longitudinal sectional view through the device, showing the mechanism for elevating the signals.

Figure 3 is an enlarged sectional detail view showing the intergeared portions of one of the signaling arrows, said arrow being elevated.

Figure 4 is a view similar to Figure 3, but showing the signaling arrow in lowered position.

Figure 5 is a vertical sectional detail view on the line 5—5 of Figure 2.

Referring particularly to the accompanying drawings, there is shown an elongated, comparatively narrow casing 10, having the enlarged cylindrical intermediate portion 11. Embracing this portion 11 is a cylindrical clamp 12, and carried by said clamp is a second clamp 13, which is adapted to be attached to the windshield post of an automobile, in such position that the casing 10 extends horizontally outward from the left hand side of the automobile. Carried by the clamp 12 are screws 14 by means of which said clamp may be held in firm engagement with the portion 11, so that the device may stand in a vertical position, regardless of whether or not the windshield is disposed in perfectly upright position. Carried by the outer end of the casing 10 is a vertical casing 14, the opposite sides of which are open, for a purpose which will presently appear herein. Swivelly mounted on the rear face of the casing 14 is the mirror 15. Disposed through the upper end of the casing 14 are the shafts 16 and 17, and pivotally mounted on said shafts, and normally depending into the casing 14, are the arrow sections 18—19, 20—21, and the stop signaling disk 22. The section 18, which is the head of the arrow, is adapted to swing outwardly through the outer open side of the casing 14, while the tail section 19 is arranged to swing through the inner side. In like manner the tail section 20 swings through the outer side of the casing while the head section 21 extends through the inner side thereof, when elevated. The pivotal ends of the arrow sections 18, 19, 20, and 21, are provided with intermeshing teeth 22', so that upon force being exerted on one section of an arrow, to swing the same upwardly, the associated section will rise also.

In the pivotal end of each of the arrow sections 18 and 20, and in the pivotal end of the stop signal disk there is formed a slot comprising the longitudinal straight portion 23, arranged adjacent one edge of the section, and the arcuate portion 24, extending from the inner end of the straight portion to a point in longitudinal alinement with the pivot of the section, and outwardly thereof. Each of the sections, of each of the arrows, is formed with a nose 25, arranged to engage the nose of the associated section, when the sections are in depending position within the casing, whereby to maintain the sections in proper position within the casing, when at rest.

Extending transversely through the casing 10, a short distance outwardly of the cylindrical portion 11, is a shaft 26, and pivotally supported on this shaft, and extending throughout the entire length of the casing, are the three rock levers 27, 28, and 29. In the upper side of the inner end of the casing 10 there are formed three longitudinal slots 30, and slidably disposed for vertical movement in these slots are the stems 31, 32, and 33, respectively, the lower end of the first of which is pivotally connected to the adjacent end of the lever 27, while the lower ends of the stems 32 and 33 are pivotally connected respectively to the adjacent ends of the levers 28, and 29. The other ends of the levers 27, 28, and 29 each carries pivotally thereon, the vertically extending link 34, the said link extending into the casing 14, where it is provided with the laterally directed pin 27, on its upper end. It will be noted that the pin of one link 34 plays in the slot of the pivotal end of the stop disk 22, while the pins of the other links 34 play, respectively in the slots of the arrow sections 20 and 18. Carried by the slotted portion of each of the arrow sections, and by the pivotal portion of the stop disk 22, is a pin 18', and formed in the upper end of each link 34, is a comparatively short, longitudinal slot 19', which receives a pin 18'. The length of the slot 19' is such that when the parts are in the position of Figure 4, the pin 27' lies within the upper portions of the vertical slot 23, and the upper end wall of the slot 19' engages with the pin 18', but when the parts are in the position of Figure 3, the pin 27' is in the curved portion 24 of the slot, and the lower end wall of the slot 19' engages with the pin 18'.

In one side of each of the stems 31, 32, and 33 there is formed a notch 39, so that when a stem is depressed, and tilted toward the left, to a slight degree, said notch will receive the adjacent portion of the wall of a slot, to hold the stem in depressed position, and consequently the corresponding arrow signal in elevated signaling position. The upper ends of the stems are provided with the finger buttons 40. In the opposite sides of the inner end of the casing 10 there are formed the vertical slots 41, in which plays the shank of the pivot of a lever and stem, said pivot having its head bearing on the outer face of the casing, as shown at 42, whereby to maintain the vertical alinement, and insure the proper movement of the parts.

On the shaft 17 is a flanged roller 43, with which engages the projecting lug 44, on the pivotal end of the stop disk 22, whereby to limit the upward swinging movement of said disk. The upper edges of the signal members engage with the upper portion of the casing 14, to limit their movements upwardly.

When the driver desires to signal a left hand turn he depresses the stem 33, with the result that the arrow comprising the sections 18 and 19 will be elevated into signaling position. If the driver simply wishes to display the signal for a short time, he exerts pressure on the stem, toward the right, while he depresses the stem, so that upon releasing his finger from the button 40, the stem will immediately rise, and the signal swing down into the casing 14. If however, he desires the signal to remain elevated for any length of time, especially when he is using the stop signal, he exerts pressure on the stem, toward the left, so that when the stem moves downwardly the adjacent end of the slot 30 will enter the notch 39, and hold the stem depressed, and consequently maintain the stop signal disk 22 in elevated position. By pressing the stem toward the right, when in such depressed position, the stem will be disengaged from the wall of the slot and rise, under the influence of the spring 37, and the weight of the signal, through the medium of the link and rock lever.

Thus by depressing the stem 33, the driver can display a signal indicating a proposed turn to the left, and by depressing the stems 32 and 31, he can successively display signals indicating proposed turn to the right or intention to stop.

Attention is called to the fact that the entire signaling and operating mechanism are self contained, and that the device requires no alterations or modifications to an automobile to permit use of same therewith. The device is simply clamped to the post of the windshield, on the left hand side of the automobile, so that it projects outwardly therefrom to be seen by others.

It will be particularly noted that when the signaling elements are in lowered position the pins 27' lie in the upper ends of the straight portions 23, of the slots of the pivotal portions of the signaling members, whereby any pivotal movement of said members is effectively prevented, until the link has raised the pin 27' sufficiently to lie opposite the adjacent end of the arcuate portion 24. Further movement of the link will cause the lower end wall of the slot 19' to bear against the pin 18' and swing the signaling element upwardly into horizontal position, the intermeshing gearing, between the sections of the arrows, causing the other section to be elevated at the same time.

What is claimed is:

1. A signaling device for vehicles including a support, a vertical casing on one end of the support, vertically reciprocable operating stems on the other end of the support, rock levers in the support operatively connected with the stems at one end, and signaling elements movably supported in the casing and operatively connected with the other ends of the rock levers.

2. A signaling device for vehicles including a support, a casing on the support, stems on the support, rock levers mounted in the support and pivotally connected to one end of the respective stems, signal elements pivotally supported in said casing, links carried by the other ends of said rock levers and engaged with the signal elements for holding the latter in lowered position, at times, and means on the signal elements engaged with the links for elevating and lowering said elements.

3. A signaling device for vehicles including a support, a vertical casing mounted on one end of the support, vertically reciprocable operating stems mounted in the other end of the support, longitudinally extending rock levers mounted in the support and operatively connected with said stems, pivoted signal elements supported in said casing and having slots in their pivotal portions, links on the said rock levers having means engaged in said slots for holding the signaling elements in lowered position, and means on the links engaged with the signal elements for actuating the latter into signaling position.

4. A signaling device for vehicles including a support, a vertical casing on one end of the support, vertically reciprocable stems on the other end of the support, longitudinally extending rock levers mounted in the support and pivotally connected to the respective stems, signal elements pivotally supported in the said casing and each having a slot in its pivoted portion comprising a straight portion and an arcuate portion, links carried by the other ends of said rock levers and provided with projections engaged in said slots for holding the signal elements in lowered position, at times, and means on the signal elements engaged with the links for elevating and lowering said elements.

In testimony whereof, I affix my signature.

GEORGE H. BRUDER.